(12) United States Patent
Akiyama et al.

(10) Patent No.: US 8,652,664 B2
(45) Date of Patent: *Feb. 18, 2014

(54) METHOD FOR TAKING OUT A SEALING PLATE OF A FUEL CELL AND A SEALING PLATE DIRECTLY USED IN THE METHOD

(75) Inventors: Shiro Akiyama, Okazaki (JP);
Shigemitsu Nomoto, Okazaki (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/458,849

(22) Filed: Apr. 27, 2012

(65) Prior Publication Data

US 2012/0214087 A1    Aug. 23, 2012

Related U.S. Application Data

(63) Continuation of application No. 12/296,289, filed as application No. PCT/JP2007/055646 on Mar. 20, 2007, now Pat. No. 8,202,637.

(30) Foreign Application Priority Data

Apr. 11, 2006   (JP) ................................ 2006-108735

(51) Int. Cl.
*H01M 14/00*    (2006.01)
(52) U.S. Cl.
USPC ............... 429/8; 429/400; 429/468; 429/507; 429/535; 429/423; 429/444; 429/514; 442/71; 442/104
(58) Field of Classification Search
USPC ............. 429/409, 423, 444, 514, 8, 400, 468, 429/507, 535; 442/71, 104
See application file for complete search history.

(56) References Cited

U.S. PATENT DOCUMENTS

2004/0110057 A1    6/2004    Yoshimoto et al.

FOREIGN PATENT DOCUMENTS

| DE | 935 374 | B | 11/1955 |
|----|---------|---|---------|
| DE | 19 02 904 | A | 9/1970 |
| JP | 62-140942 | A | 6/1987 |
| JP | 62-140943 | A | 6/1987 |
| JP | 02-143808 | A | 6/1990 |
| JP | 09-194056 | A | 7/1997 |
| JP | 2000-012053 | A | 1/2000 |
| JP | 2000-331691 | A | 11/2000 |
| JP | 2001-110436 | A | 4/2001 |
| JP | 2002-211776 | A | 7/2002 |
| JP | 2004-179109 | A | 6/2004 |

(Continued)

OTHER PUBLICATIONS

Proffesional Translation of JP 62-140942 {06/2411987) (Original Patent is in IDS).*

(Continued)

*Primary Examiner* — Patrick Ryan
*Assistant Examiner* — Alex Usyatinsky
(74) *Attorney, Agent, or Firm* — Kenyon & Kenyon LLP

(57) ABSTRACT

A fuel cell sealing plate taking-out method that may include taking out a sealing plate from a stack of sealing plates one by one while an air layer exists between adjacent sealing plates of the stack of fuel cells. A protrusion may be formed beforehand at one or more surfaces of each sealing plate. Due to the air layer existing between adjacent sealing plates, it may be possible to take out the sealing plate one by one from the stack of sealing plates.

2 Claims, 6 Drawing Sheets

(56) References Cited

FOREIGN PATENT DOCUMENTS

| | | |
|---|---|---|
| JP | 2004-185811 A | 7/2004 |
| JP | 2004-185944 A | 7/2004 |
| JP | 2004-349014 A | 12/2004 |
| JP | 2005-026067 A | 1/2005 |

OTHER PUBLICATIONS

Office Action issued Jan. 31, 2012 in JP 2006-108735 and English translation thereof.

Machine Translation of JP 2002-211776 A (Translation obtained on Jun. 11, 2011).

Machine Translation of JP 2004-179109 (Original Patent is in IDS) (Translation obtained on May 27, 2011).

Partial Translation of JP 62-140942 (Jun. 24, 1987) for U.S. Appl. No. 12/296,289 (Original Patent is in IDS) (Translation obtained on Jun. 16, 2011).

Office Action issued on Mar. 26, 2012 in DE Application No. 11 2007 000 899.7 and English translation thereof.

* cited by examiner

METHOD FOR TAKING OUT A SEALING PLATE OF A FUEL CELL AND A SEALING PLATE DIRECTLY USED IN THE METHOD

This is a continuation of application Ser. No. 12/296,289 filed 7 Oct. 2008, which is a 371 national phase application of PCT/JP2007/055646 filed 20 Mar. 2007, which claims priority of Japanese Patent Application No. 2006-108735 filed 11 Apr. 2006, the contents of which are incorporated herein by reference.

TECHNICAL FIELD

The present invention relates to a fuel cell sealing plate taking-out method for taking out a fuel cell sealing plate one by one from a stack of fuel cell sealing plates and a sealing plate directly used in the method.

BACKGROUND

A fuel cell is constructed from an MEA (Membrane-Electrode Assembly) and separators sandwiching the MEA. A gas diffusion layer is disposed between the MEA and the separator. In the separator, at a power generating region, a fuel gas passage or an oxidant gas passage is formed at a surface of the separator facing the MEA, and a coolant passage is formed at a surface opposite the surface facing the MEA. Further, in the separator, at a non-power generating region located at an outer portion of the separator, a fuel gas manifold, an oxidant gas manifold and a coolant manifold are formed. The fuel gas passage communicates with the fuel gas manifold via a fuel gas inlet/outlet passage, and the oxidant gas passage communicates with the oxidant gas manifold via an oxidant gas inlet/outlet passage. The gas inlet/outlet passage includes a gas passage groove formed at a bottom surface of the gas inlet/outlet passage and a sealing plate disposed at the gas inlet/outlet passage and covers the gas passage groove.

As disclosed in Japanese Patent Publication 2001-110436, the sealing plate is constructed of a stepped plate in order to prevent interference with the diffusion layer.

BRIEF SUMMARY

Certain embodiments of the present invention relate to cases where a fuel cell or fuel cell module is automatically assembled and it may be necessary to take out a sealing plate one by one from a stack of sealing plates supplied and to supply the taken-out sealing plate to a gas inlet/outlet passage of the fuel cell.

Since the sealing plate is constructed of a flat plate, when the sealing plates are stacked, the sealing plates are likely to adhere to each other, because the sealing plates closely contact each other due to a low pressure and/or due to a static electricity at the contact portion. As a result, it may be difficult to separate the sealing plates one by one from each other.

An object of certain embodiments of the present invention is to provide a fuel cell sealing plate taking-out method for taking out a fuel cell sealing plate one by one from a stack of fuel cell sealing plates, and a fuel cell sealing plate directly used in the method Certain embodiments of the present invention may include the following methods and sealing plates:

(1) A method for taking out a sealing plate of a fuel cell one by one from a stack of sealing plates, the sealing plate to be installed to a gas inlet/outlet passage of a fuel cell so as to cover a gas passage groove formed at the gas inlet-outlet passage, the method comprising:

a first step of taking out the sealing plate one by one from the stack of sealing plates under a state that an air layer exists between adjacent sealing plates; and a second step, provided between the first step and a step of installing the taken-out sealing plate to the fuel cell, of (a) placing the taken-out sealing plate on a suction plate and sucking the sealing plate from opposite sides of the sealing plate by the suction plate and a suction pad, and (b) stopping conveyance of the sealing plate to the step of installing the taken-out sealing plate to the fuel cell when taking-out of two sealing plates is detected, wherein in order to obtain the state that an air layer exists between adjacent sealing plates of the stack of sealing plates at the first step, a protrusion is beforehand formed at an at least one surface of each sealing plate and at a portion of the sealing plate which corresponds to a portion of a sealing plate installing place of the fuel cell in a direction perpendicular to a gas flow direction at the sealing plate installing place.

(2) A method according to item (1) above, wherein the sealing plate is made from synthetic resin.

(3) A sealing plate of a fuel cell directly used for a method of taking out a sealing plate from a stack of sealing plates, the sealing plate to be installed to a gas inlet-outlet passage of a fuel cell so as to cover a gas passage groove formed at the gas inlet-outlet passage, the method including:

a first step of taking out the sealing plate one by one from the stack of sealing plates under a state that an air layer exists between adjacent sealing plates of the stack of sealing plates; and a second step, provided between the first step and a step of installing the taken-out sealing plate to the fuel cell, of (a) placing the taken-out sealing plate on a suction plate and sucking the sealing plate from opposite sides of the sealing plate by the suction plate and a suction pad, and (b) stopping conveyance of the sealing plate to the step of installing the taken-out sealing plate to the fuel cell when taking-out of two sealing plates is detected, the sealing plate comprising:

a protrusion is beforehand formed at an at least one surface of each sealing plate and at a portion of the sealing plate which corresponds to a portion of a sealing plate installing place of the fuel cell in a direction perpendicular to a gas flow direction at the sealing plate installing place.

(4) A sealing plate of a fuel cell according to item (3) above, wherein a position, a width and a height of the protrusion of the sealing plate are determined such that the protrusion of the sealing plate is housed in a gas passage groove of a gas inlet/outlet passage of the separator when the sealing plate is installed to the fuel cell.

(5) A sealing plate of a fuel cell according to item (4) above, wherein the width of the protrusion of the sealing plate is equal to or smaller than a width of the gas passage groove.

(6) A sealing plate of a fuel cell according to item (3) above, wherein the protrusion is formed at a surface of the sealing plate opposite to a surface of the sealing plate facing a bottom surface of the gas passage groove when the sealing plate is installed to the fuel cell;

(7) A sealing plate of a fuel cell according to item (3) above, wherein the sealing plate is made from synthetic resin.

Using the methods and apparatuses discussed above, certain embodiments of the present invention may have the following technical advantages.

According to the method for taking out a sealing plate of a fuel cell according to item (1) above, since the air layer is formed between the adjacent sealing plates, the adjacent sealing plates are not pressed by a pressure difference from outside surfaces toward the contact surface and do not adhere to each other due to static electricity. As a result, it may be possible to ensure separation of the sealing plates one by one from the stack of sealing plates.

Further, since the protrusion is formed in at an at least one surface of the sealing plate, in the stack of sealing plates, an air layer can be formed between adjacent sealing plates except the protrusion.

Further, since the taken-out sealing plate is sucked from opposite sides thereof and the sucking pressures on the opposite sides in the case of taking out two sealing plates are different from those in the case of taking out one sealing plate, by detecting the sucking pressure difference, conveyance of the sealing plates in the case of taking out two sealing plates to the next step can be stopped.

According to the method according to item (2) above, the present invention is further effective, because adhesion of adjacent sealing plates due to static electricity can be prevented by the air layer formed between the adjacent sealing plates by the protrusion, despite that in the case of a synthetic resin sealing plate an adhesion of the adjacent sealing plates due to static electricity is likely to occur.

According to the sealing plate of a fuel cell according to item (3) above, since the protrusion is formed in the sealing plate, an air layer exists between adjacent sealing plates except the protrusion. As a result, the adjacent sealing plates are not pressed from the outside surfaces toward the contact surface and the adjacent sealing plates do not adhere to each other due to static electricity, so that it is possible to ensure separation of a sealing plate from the stack of the sealing plates one by one.

According to the sealing plate of a fuel cell according to item (4) above, since the position, the width and the height of the protrusion in the sealing plate are determined such that the protrusion of the sealing plate is housed in a gas passage groove of a gas inlet/outlet passage of the separator, when the sealing plate is installed to the fuel cell separator, the protrusion of the sealing plate is fit into the gas passage groove of the gas inlet/outlet passage of the separator, so that it is possible to determine in position the sealing plate relative to the gas inlet/outlet passage in a direction perpendicular to the gas passage groove (i.e., a gas flow direction at the gas inlet/outlet passage). As a result, a dimensional accuracy of clearances between the longitudinal ends of the sealing plate and side surfaces of the gas inlet/outlet passage facing the longitudinal ends of the sealing plate can be low, so that a manufacturing cost of the sealing plate can be reduced by that dimensional low accuracy. Further, the clearances between the longitudinal ends of the sealing plates and side surfaces of the gas inlet/outlet passage facing the longitudinal ends of the sealing plate can be used as a space for absorbing a bulging-out adhesive.

According to the sealing plate of a fuel cell according to item (5) above, since the width of the protrusion of the sealing plate is nearly equal to the width of the gas passage groove, determination in position of the sealing plate by the protrusion is of a high accuracy.

According to the sealing plate of a fuel cell according to item (7) above, the present invention is further effective, because adhesion of adjacent sealing plates due to static electricity can be prevented by the air layer formed between the adjacent sealing plates by the protrusion, despite that in the case of a synthetic resin sealing plate an adhesion of the adjacent sealing plates due to static electricity is likely to occur.

According to the sealing plate of a fuel cell according to item (6) above, since the protrusion is formed at a surface of the sealing plate opposite to a surface of the sealing plate facing a bottom surface of the gas passage groove when the sealing plate is installed to the fuel cell, air layers can be formed between adjacent sealing plates in the stack of the sealing plates like in the case where the protrusion is formed at a surface of the sealing plate facing a bottom surface of the gas passage groove. In the case where the protrusion is formed at a surface of the sealing plate opposite to a surface of the sealing plate facing a bottom surface of the gas passage groove, the protrusion is embedded in the adhesive located between the separators, a concave may be formed in the separator facing the protrusion if necessary.

The invention may be embodied by numerous methods, systems, devices, and products, and the description and drawings provided herein are examples of the invention. Other embodiments, which incorporate some or all of the steps and features, are also possible.

BRIEF DESCRIPTION OF THE DRAWINGS

Referring to the drawings, which form a part of this disclosure.

DETAILED DESCRIPTION

A method for taking out a fuel cell sealing plate (which includes a two sealing plate taking-out preventing method), and a fuel cell sealing plate directly used in conducting the method, respectively, according to certain embodiments of the present invention will be explained with reference to FIGS. 1-21. The fuel cell sealing plate will be referred to as a sealing plate.

FIGS. 1-12 illustrate a first embodiment (a sealing plate taking-out method and a sealing plate-according to the first embodiment) of the invention.

Figure 14:
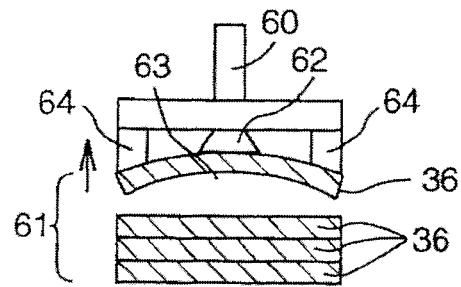
FIG. 14 is a front elevational view of a sealing plate taking-out apparatus conducting a fuel cell sealing plate taking out method according to a second embodiment of the present invention.

FIG. 14 illustrates a second embodiment (a sealing plate taking-out method and a sealing plate according to the second embodiment) of the invention.

FIGS. 15-18 illustrate a third embodiment (a sealing plate taking-out method and a sealing plate according to the third embodiment) of the invention.

Figure 19:
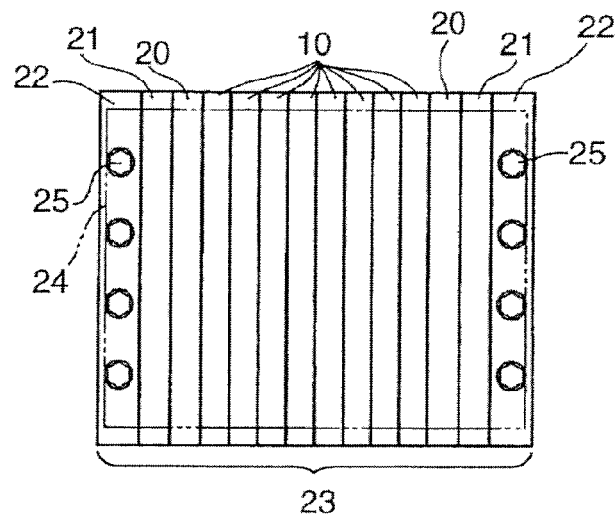
FIG. 19 is a side elevational view of a fuel cell stack to which the present invention is applied.
Figure 20:
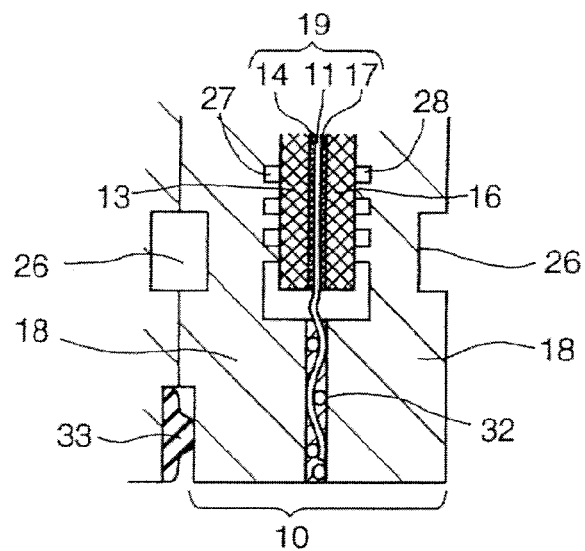
FIG. 20 is an enlarged cross-sectional view of a portion of FIG. 19.
Figure 21:
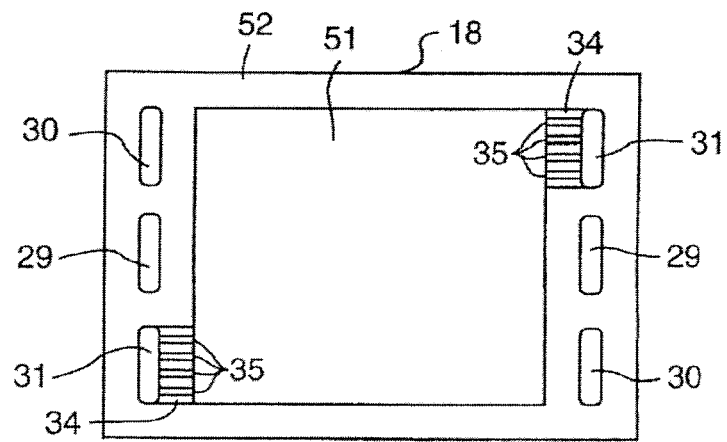
FIG. 21 is a front elevational view of a fuel cell of FIG. 19.

FIGS. 19-21 illustrate a fuel cell structure applicable to any embodiment of the present invention.

Structures common to all embodiments of the present invention are denoted with the same references throughout all embodiments of the present invention.

First, structures common to all embodiments of the present invention will be explained with reference to FIGS. 19-21.

A fuel cell to which the present invention is applied is a solid polymer electrolyte membrane-type fuel cell 10. The fuel cell 10 is installed to a fuel cell vehicle. The fuel cell 10 may be used for other than a vehicle.

As illustrated in FIGS. 19-21, the solid polymer electrolyte membrane-type fuel cell 10 includes a layered structure of a membrane-electrode assembly 19 (MEA) and a separator 18.

The membrane-electrode assembly 19 includes an electrolyte membrane 11 made from an ion-exchange membrane, a first electrode (i.e., anode) 14 made from a catalyst layer disposed on one side of the electrolyte membrane 11 and a second electrode (i.e., cathode) 17 made from a catalyst layer. A diffusion layer 13 is disposed between the membrane-electrode assembly 19 and the separator 18 on the side of the anode. A diffusion layer 16 is disposed between the membrane-electrode assembly 19 and the separator 18 on the side of the cathode.

The membrane-electrode assembly 19 and the separator 18 are layered to construct the fuel cell 10. A plurality of fuel cells are stacked to construct a stack of fuel cells. A terminal 20, an insulator 21 and an end plate 22 are disposed at each end of the stack of fuel cells. The opposite end plates 22 are fixed to a fastening member (for example, a tension plate 24) extending in a fuel cell stacking direction by a bolt and nut 25. The stack of fuel cells are fastened in the fuel cell stacking direction to construct a fuel cell stack 23.

In the separator 18 located on the anode side of the fuel cell 10, at a power generating region 51, a fuel gas passage 27 for supplying fuel gas (i.e., usually, hydrogen) to the anode 14 is formed at the surface facing the MEA. In the separator 18 located on the cathode side of the fuel cell 10, at the power generating region 51, an oxidant gas passage 28 for supplying oxidant gas (i.e., usually, air) to the cathode 17 is formed at the surface facing the MEA. Further, in the separator 18, a coolant passage 26 for supplying coolant (i.e., usually, water) is formed at a surface opposite the surface where the gas passages 27 and 28 are formed. In the separator 18, at a non-power generating region 52, a fuel gas manifold 30, an oxidant gas manifold 31 and a coolant manifold 29 are formed.

The fuel gas manifold 30 communicates with the fuel gas passage 27 via a gas inlet/outlet passage 34, and the oxidant gas manifold 31 communicates with the oxidant gas passage 28 via the gas inlet/outlet passage 34. The coolant manifold 29 communicates with the coolant passage 26.

At the anode 14 of each fuel cell 10, electrolytic dissociation to exchange hydrogen to hydrogen ion (i.e., proton) and electron, and the electron moves in the electrolyte membrane 11 to the cathode 17. At the cathode 17, water is produced and power is generated according to the following equation from oxygen and the hydrogen ion and electron which is generated at the anode of the adjacent fuel cell and comes to the cathode of the instant fuel cell, or is generated at the anode of the fuel cell located at a first end of the fuel cell stack and comes via an outside circuit to the cathode of the fuel cell located at a second end of the fuel cell stack.

At the anode: $H_2 \rightarrow 2H^+ + 2e^-$

At the cathode: $2H^+ + 2e^- + (1/2)O_2 \rightarrow H_2O$

Each fluids are sealed from each other and from outside. A first seal member 32 seals between the two separators 18 sandwiching the MEA 19, and a second seal member 33 seals between adjacent fuel cells 10.

The first seal member 32 is a sealant made from an adhesive (sealing adhesive), and the second seal member 33 is a rubber seal member made from silicone rubber, fluorine rubber, or EPDM (ethylen-propylen-dien rubber). Both the first seal member 32 and the second seal member 33 may be made from sealing adhesive or rubber seal material.

Figure 5:
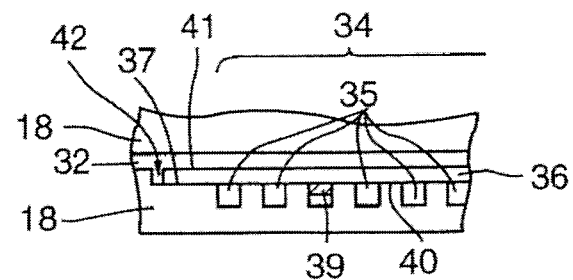
FIG. 5 is a cross-sectional view of a portion of the fuel cell to which the fuel cell sealing plate is installed.

As illustrated in FIG. 21 and FIG. 5, one or more (usually, a plurality of) concave gas passage grooves 35 are formed at the gas inlet/outlet passage 34. At the gas inlet/outlet passage 34, a sealing plate 36 is disposed so as to cover the gas passage groove 35. In the separator, a step 37 having a depth equal to a thickness of the sealing plate 36 is formed for receiving end portions of the sealing plate 36 therein. When the step 37 receives therein the end portion of the sealing plate 36, a surface of the separator 18 and a surface of the sealing plate 36 are located in the same plane. When the sealing plate 36 is disposed in the gas inlet/outlet passage 34, the gas passage groove 35 is covered with the sealing plate 36 and constructs a tunnel-like passage.

The sealing plate 36 is rectangular and is disposed such that a longitudinal direction of the rectangle is directed in a gas passage width direction of the gas inlet/outlet passage 34. The gas passage groove 35 extends in a width direction of the sealing plate 36. Since gas flows in the gas passage groove 35, the width direction of the sealing plate 36 coincides with the gas flow direction at the gas inlet/outlet passage 34, and the longitudinal direction of the sealing plate 36 coincides with a direction perpendicular to the gas flow direction at the gas inlet/outlet passage 34.

The sealing plate 36 comprises a flat plate (which may include a stepped flat plate). When the diffusion layers 13, 16 overlap with the sealing plate 36, the sealing plate 36 comprises a stepped flat plate having a step 38 for receiving the diffusion layers 13, 16 therein and having a thickness equal to the thickness of the diffusion layers 13, 16. The step 38 extends in the longitudinal direction of the sealing plate 36. A surface of the sealing plate opposite the surface of the sealing plate faces a bottom surface of the gas inlet/outlet passage 34 and is coated with the first seal member (e.g., adhesive) and faces a separator 18 having an opposite polarity of the same fuel cell (i.e., a cathode side separator when the sealing plate is disposed at the anode side separator, and an anode side separator when the sealing plate is disposed at the cathode side separator).

The sealing plate 36 is made from synthetic resin, but is not limited to synthetic resin. The sealing plate 36 may be made from rubber, metal and carbon, etc.

As illustrated in FIGS. 11-17, in order to determine a position of the sealing plate 36 and dispose the sealing plate in the gas inlet/outlet passage 34 of the fuel cell 10 using an automatic apparatus, firstly a sealing plate 36 is taken out one by one from a stack 61 of sealing plates supplied, for example, by sucking the sealing plate by a suction pad 62 of a sealing plate taking-out apparatus 60. Then, the taken-out sealing plate 36 is determined in position at a position determining station 65, and the sealing plate 36 determined in position is conveyed and supplied to an assembly step of the fuel cell 10 where the sealing plate is installed to the fuel cell 10.

It may be necessary to take out the sealing plate 36 from the stack 61 of sealing plates one by one by sucking the sealing plate by the suction pad 62. When the sealing plate 36 is flat, as illustrated comparatively, in examples of FIGS. 11 and 13, it is sometimes difficult to take out the sealing plate 36 from the stack 61 of sealing plates one by one (i.e., as a result, two sealing plates are taken out). This is because when sealing plates are layered, adjacent sealing plates closely contact each other, and a pressure lower at the contact surface is likely lower than that at an outside surface (e.g., a vacuum) and/or a static electricity is generated at the contact surface, so that the adjacent sealing plates adhere to each other.

The fuel cell sealing plate taking-out method and the sealing plate 36 directly used for conducting the method according to certain embodiments of the present invention make it possible to take out the sealing plate 36 from the stack 61 of sealing plates one by one.

Figure 12:
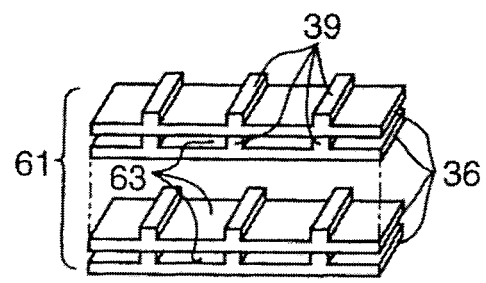
FIG. 12 is a perspective view of the stack of sealing plates according to the first embodiment of the present invention.
Figure 13:
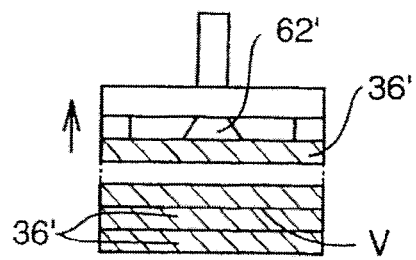
FIG. 13 is a front elevational view of a sealing plate taking-out apparatus according to the comparison example.
Figure 16:
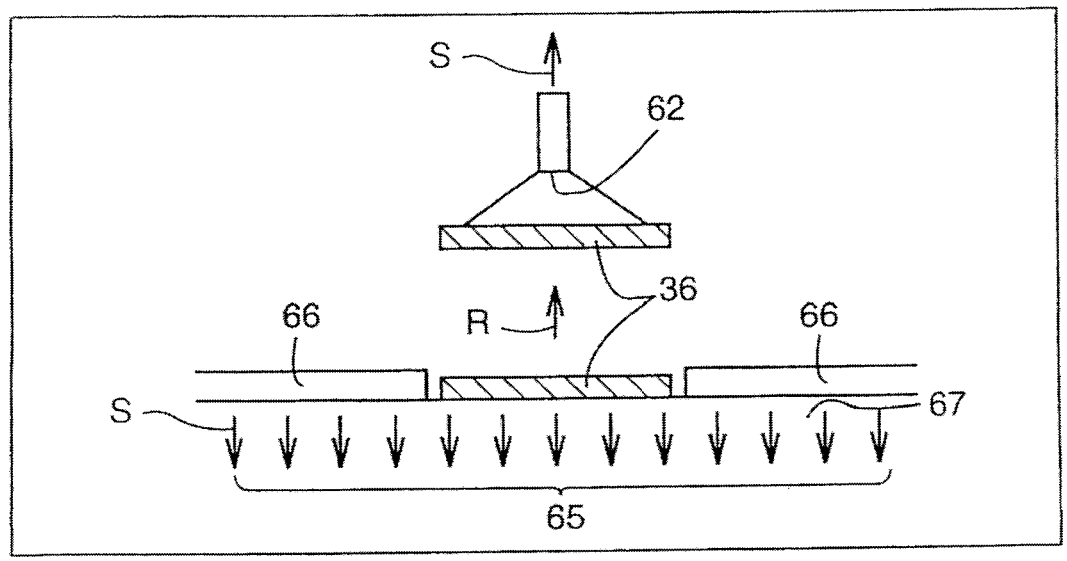
FIG. 16 is a front elevational view of a two sealing plate taking-out preventing portion of the sealing plate taking-out apparatus according to the third embodiment of the present invention.

More particularly, as illustrated in FIG. 12 and FIG. 14, a portion of the fuel cell sealing plate taking-out method common to each embodiment of the present invention is a method for the sealing plate 36 from the stack 61 of sealing plates one by one, wherein an air layer 63 is formed between adjacent sealing plates 36 and in that state the sealing plate 36 is taken out one by one from the stack 61 of sealing plates. A method for forming the air layer 63 differs according to each embodiment. The method according to certain embodiments of the present invention may include a method where when taking out two sealing plates is detected, the taking out of two sealing plates is omitted (FIG. 16). Comparatively, in the conventional method, as illustrated, for example, in FIG. 13, an air layer is not formed between adjacent workpieces 36' and a vacuum is generated between the adjacent workpieces 36'.

Some of the effects and technical advantages obtained in the portion of the fuel cell sealing plate taking-out method common to each embodiment of the present invention will be explained. Since the air layer 63 is formed between the adjacent sealing plates 36, the adjacent sealing plates 36 are not pressed from outside surfaces to the contact surface thereof by a pressure difference. Further, the adjacent sealing plates 36 do not adhere to each other due to a static electricity. As a result, it is possible to take out the sealing plate 36 from the stack 61 of sealing plates one by one.

In the case where the sealing plate 36 is made from synthetic resin, the static electricity is likely to collect at the surface, so that the adjacent sealing plates 36 are apt to adhere to each other due to the static electricity. By forming the air layer 63 between the adjacent sealing plate 36, adhesion of the adjacent sealing plates 36 due to the static electricity can be suppressed, so that the prevention of adhesion due to the air layer 63 becomes further effective.

Next, portions of the sealing plate taking-out method[[t]] and the sealing plates 36 directly used in conducting the method unique to each embodiment of the present invention will be explained.

First Embodiment

FIGS. 1-11

[Method for Taking Out the Sealing Plate 36 According to a First Embodiment]

Figure 1:
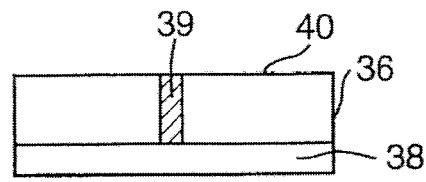
FIG. 1 is a plan view of a sealing plate of a fuel cell according to a first embodiment of the present invention.
Figure 2:
FIG. 2 is a front elevational view of the sealing plate of a fuel cell according to the first embodiment of the present invention.
Figure 3:
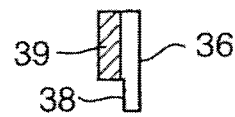
FIG. 3 is a side elevational view of the sealing plate of a fuel cell according to the first embodiment of the present invention.
Figure 4:
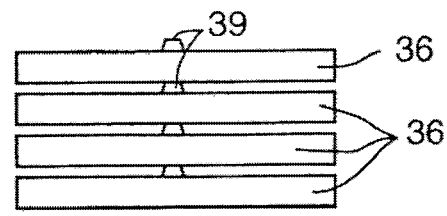
FIG. 4 is a side elevational view of a stack of fuel cell sealing plates according to the first embodiment of the present invention.
Figure 10:
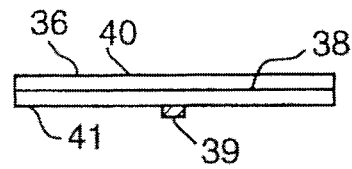
FIG. 10 is a front elevational view of the sealing plate according to the first embodiment of the invention in a case where the protrusion is formed at a surface opposite the surface of the sealing plate facing the gas passage groove.
Figure 11:
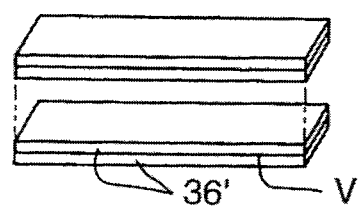
FIG. 11 is a perspective view of a stack of sealing plates according to a comparison example.

In the fuel cell sealing plate taking-out method according to the first embodiment of the present invention, in order to form the air layer 63 between adjacent sealing plates 36 of the stack 1 of sealing plates, a protrusion 39 is formed as illustrated in FIG. 4 and FIG. 11. The protrusion 39 is formed at an outermost surface of an at least one surface of each sealing plate 36. (The at least one surface may be a surface 40 of the sealing plate facing a bottom surface of the gas inlet/outlet passage 34, or a surface 41 of the sealing plate opposite the surface 40, when the sealing plate is disposed at the gas inlet/outlet passage 34. The outermost surface is a surface of the sealing plate other than a surface of a recess receding by the step 38 from the outermost surface.) The protrusion 39 is formed at a portion of the sealing plate in the direction perpendicular to the gas flow direction at the sealing plate installing portion (i.e., the gas inlet/outlet passage 34) of the fuel cell such that the protrusion 39 protrudes from the surface 40, 41. In FIGS. 1-10, the region of the protrusion 39 is shown by a hatching, which is not a hatching for a cross section.

Some of the effects and technical advantages of the fuel cell sealing plate taking-out method according to the first embodiment of the present invention will be explained. Since the protrusion 39 is formed at the at least one surface 40, 41 of each sealing plate 36, the air layer 63 can be formed between adjacent sealing plates 36 of the stack 61 of sealing plates except a top of the sealing plate 36. Due to the air layer 63, a vacuum (a pressure lower than the outermost surface) is not produced between the adjacent sealing plates 36, and adhesion due to a static electricity is suppressed, so that it is possible to take out the sealing plate one by one from the stack 61 of sealing plates.

[Sealing Plate 36 According to a First Embodiment]

As illustrated in FIGS. 1-11, the fuel cell sealing plate 36 according to the first embodiment of the present invention has a protrusion 39 formed at a least one surface 40, 41 of the sealing plate 36. The protrusion 39 is formed at one portion of the at least one surface of the sealing plate in the direction perpendicular to the gas flow direction (the longitudinal direction of the gas passage groove 35) at the fuel cell sealing plate installing portion.

Preferably, the sealing plate 36 is made from synthetic resin, but may be made from rubber or metal. Preferably, the protrusion 39 may be formed integrally with the sealing plate 36, but may be formed separately from the sealing plate 36 and fixed to the sealing plate 36 by an adhesive, etc.

A position, a number, a width (i.e., a width in the longitudinal direction of the sealing plate 36) and a height (i.e., a height from the surface 40, 41) of the protrusion 39 in the sealing plate 36 are determined such that the protrusion 39 of the sealing plate 36 is housed in the gas passage groove 35 of the gas inlet/outlet passage 34 of the separator 18 when the sealing plate 36 is installed to the fuel cell 10.

More particularly, the width of the protrusion 39 of the sealing plate 36 is substantially equal to the width of the gas passage groove 35. (As illustrated in FIG. 5, since the protrusion fits into the groove 35, the width of the protrusion is slightly smaller than the width of the groove 35.) Due to this, the protrusion 39 can fit in the gas passage groove 35, and can be used for positional determination of the sealing plate 36 in the longitudinal direction of the gas inlet/outlet passage 34.

Figure 6:
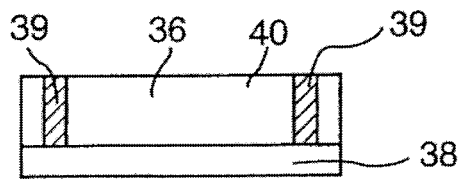
FIG. 6 is a plan view of the sealing plate where a plurality of protrusions are formed, of the fuel cell according to the first embodiment of the present invention.
Figure 7:
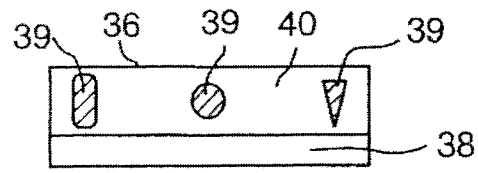
FIG. 7 is a plan view of the sealing plate according to the first embodiment of the present invention where a plurality of protrusions having shapes which can be taken, other than a rectangle are shown in a single sealing plate.
Figure 8:
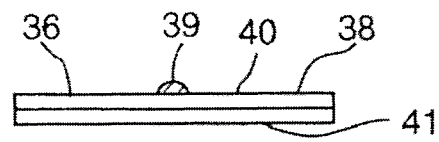
FIG. 8 is a cross-sectional view of a portion of the sealing plate according to the first embodiment of the present invention where a protrusion having the shape of an arch as one of the cross-sectional shapes of the protrusion which can be taken.
Figure 9:
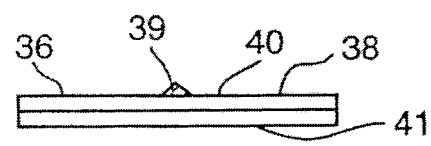
FIG. 9 is a cross-sectional view of a portion of the sealing plate according to the first embodiment of the present invention where a protrusion having the shape of a triangle as one of the cross-sectional shapes of the protrusion which can be taken.

The number of protrusion 39 is not limited to one, and a plurality of protrusions 39 can be provided as illustrated in FIG. 6. A shape of the protrusion 39 in the plan view thereof may be a circle, an elongated circle and a polygon (e.g., a triangle).

A cross-sectional shape of the protrusion 39 in a plane perpendicular to the surface 40, 41 may be a rectangle or a shape other than the rectangle (e.g., an arc (FIG. 8)), a triangle (FIG. 9) or a trapezoid. When the cross-sectional shape of the protrusion is a rectangle or a trapezoid, the top of the protrusion 39 is a flat plane and plane-contacts the adjacent sealing plate when the sealing plates are layered. When the cross-sectional shape of the protrusion is an arc or a triangle, the top of the protrusion 39 is a point and point-contacts the adjacent sealing plate when the sealing plates are layered.

As illustrated in FIG. 10, the protrusion 39 may be formed at the surface 41 of the sealing plate 36 opposite to the surface 40 of the sealing plate 36 facing the bottom surface of the gas passage groove 35 when the sealing plate 36 is installed to the fuel cell. In this case, the protrusion 39 is embedded in the adhesive contacting the surface 41 of the sealing plate 36. At a portion of the adjacent separator 18 facing the protrusion 39, a concave may be formed for preventing interference with the protrusion 39.

Some of the effects and technical advantages of the fuel cell sealing plate 36 according to the first embodiment of the present invention will be explained. Since the protrusion 39 is formed in the sealing plate 36, the air layer 63 is formed between the adjacent sealing plates 36 except the protrusion 39. Due to the air layer 63, a vacuum (a pressure lower than the outermost surface) is not produced between the adjacent sealing plates 36, and adhesion due to a static electricity is suppressed, so that it is possible to separate and take out the sealing plate 36 one by one from the stack 61 of sealing plates.

Since the position, the width and the height of the protrusion 39 in the sealing plate 36 are determined such that the protrusion 39 of the sealing plate 36 is housed in the gas passage groove 35 of the gas inlet/outlet passage 34 of the separator, when the sealing plate 36 is installed to the fuel cell separator 18, the protrusion 39 of the sealing plate 36 is fit into the gas passage groove 35 of the gas inlet/outlet passage 34 of the separator 18, so that it is possible to determine in position the sealing plate 36 relative to the gas inlet/outlet passage 34 in a direction perpendicular to the gas passage groove 35 (i.e., a gas flow direction at the gas inlet/outlet passage 34). As a result, a dimensional accuracy of clearances between the longitudinal ends of the sealing plate 36 and side surfaces of the gas inlet/outlet passage 34 facing the longitudinal ends of the sealing plate can be low as compared with a case where the sealing plate is determined in position by contacting the longitudinal end of the sealing plate with the side surfaces of the gas inlet/outlet passage 34 facing the longitudinal ends of the sealing plate. As a result, a manufacturing cost of the sealing plate 36 can be reduced by that dimensional low accuracy. Further, the clearances 42 between the longitudinal ends of the sealing plate 36 and side surfaces of the gas inlet/outlet passage 34 facing the longitudinal ends of the sealing plate can be used as a space for absorbing a bulging-out adhesive 32.

Since the width of the protrusion 39 of the sealing plate 36 is nearly equal to the width of the gas passage groove 35, determination in position of the sealing plate by the protrusion 36 is of a high accuracy.

When the sealing plate 36 is made from synthetic resin, static electricity is likely to collect at the surface of the sealing plate 36. As a result, the adjacent sealing plates 36 are likely to adhere to each other due to the static electricity. However, in certain embodiments of the present invention, since the air layer 63 due to the protrusion 39 is formed between the adjacent sealing plates 36, the adhesion due to the static electricity is suppressed, and it is possible to take out the sealing plate one by one.

When the protrusion 39 is formed at the surface 41 of the sealing plate 36 opposite to the surface 40 of the sealing plate 36 facing the bottom surface of the gas passage groove 35 when the sealing plate 36 is installed to the fuel cell, the air layer 63 can be formed between the adjacent sealing plates 36 in the stack 61 of sealing plates, as in the case where the protrusion 39 is formed at the surface 40 of the sealing plate 36 facing the bottom surface of the gas passage groove 35. In the case where the protrusion 39 is formed at the surface 41 of the sealing plate 36 opposite to the surface 40 of the sealing plate 36 facing the bottom surface of the gas passage groove 35, the protrusion 39 is embedded in the adhesive contacting the surface 41 of the sealing plate 36. By forming a concave for preventing interference with the protrusion 39 if necessary, the sealing effect by the adhesive 32 can be almost not affected by the protrusion 39.

Second Embodiment

FIG. 12

[Sealing Plate Taking-out Method According to a Second Embodiment]

A sealing plate taking-out method according to a second embodiment of the present invention is a method where, as illustrated in, for example, FIG. 14, in order to form the air layer 63 between the adjacent sealing plates 36, a sealing plate 36 to be taken out is caused to be curved when the sealing plate is sucked and taken out. The sealing plate 36 positioned next to the sealing plate to be taken out is not curved. Contrarily, in a comparison example of FIG. 13, the workpiece 36' is not caused to be curved when sucked by a sucking pad 62', and a place between the adjacent workpieces 36' is at a vacuum or a near vacuum.

Some of the effects and technical advantages of the sealing plate taking-out method according to a second embodiment of the present invention will be explained. Since the sealing plate 36 to be taken out is caused to be curved, the air layer 63 can be formed between the sealing plate 36 to be taken out and the sealing plate positioned next to the sealing plate to be taken out. Due to the air layer 63, the adjacent sealing plates 36 are not pressed from the outside surfaces toward the contact surface thereof, and adhesion of the adjacent sealing plates due to a static electricity is suppressed. As a result, it is possible to separate and take out the sealing plate 36 surely one by one from the stack 61 of sealing plates (without taking out two sealing plates).

[Sealing Plate Taking-Out Apparatus According to a Second Embodiment]

A sealing plate taking-out apparatus 60 according to the second embodiment of the present invention is, as illustrated in, for example, FIG. 12, an apparatus directly used in taking out the fuel cell sealing plate 36 from the stack 61 of sealing plates. The apparatus comprises a suction pad 62 for sucking a central portion of the sealing plate 36, and projections 64 located on opposite sides of the suction pad 62 in the longitudinal direction of the sealing plate 36 and projecting toward the sealing plate 36 more than an end of the suction pad 62.

Some of the effects and technical advantages of the sealing plate taking-out apparatus 60 according to the second embodiment of the present invention will be explained. Since the sealing plate taking-out apparatus 60 comprises the suction pad 62 for sucking a central portion of the sealing plate, and the projections 64 pushing the sealing plate 36 at a portion other than the sucking portion of the sealing plate by the suction pad 62, the suction pad 62 and the projections 64 can bend the sealing plate 36 to be taken out in the form of an arch. As a result, between the sealing plate 36 to be taken out and the sealing plate 36 positioned next to the sealing plate to be taken out, the air layer 63 a thickness of which becomes largest at the central portion of the longitudinal direction of the sealing plate 36 can be formed. Due to the air layer 63, it is possible to ensure separation and take out the sealing plate 36 one by one from the stack 61 of sealing plates (without taking out two sealing plates).

Third Embodiment

FIGS. 15-18

[Sealing Plate Taking-Out Method According to a Third Embodiment, Including Stopping Supply in the Case of Taking Out Two Sealing Plates]

In the fuel cell sealing plate taking-out method according to the third embodiment of the present invention, after taking out the sealing plate 36 and before installing the taken-out sealing plate to a fuel cell, the taken-out sealing plate 36 is sucked from opposite surfaces thereof When taking out of two sealing plates is detected, conveyance of the sealing plates 36 to the assembly step of the fuel cells is stopped.

Figure 15:
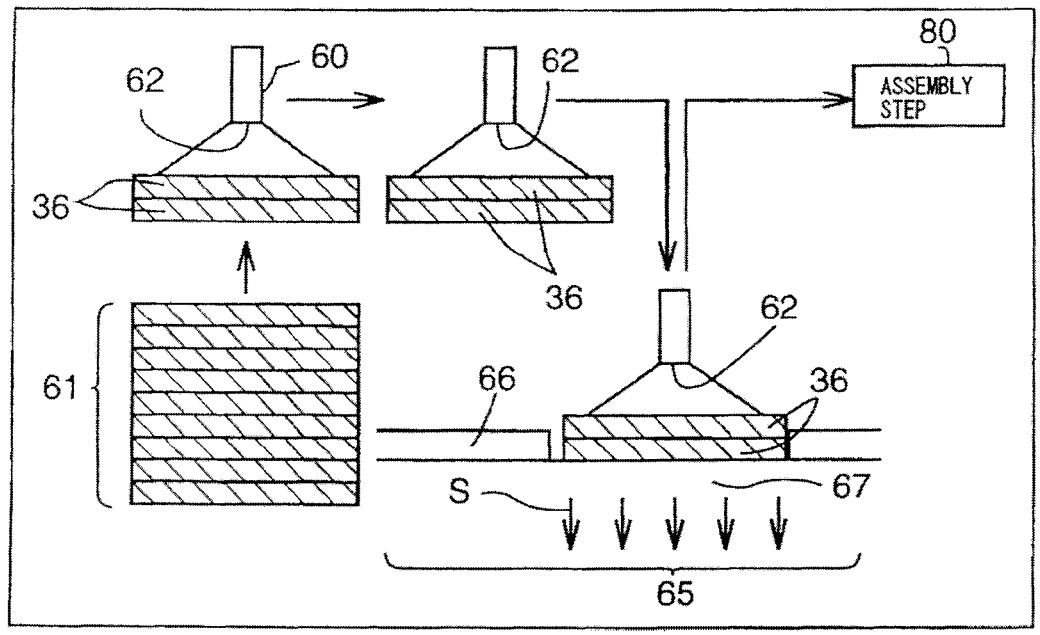
FIG. 15 is a front elevational view of a sealing plate taking-out apparatus conducting a fuel cell sealing plate taking out method according to a third embodiment of the present invention.
Figure 17:
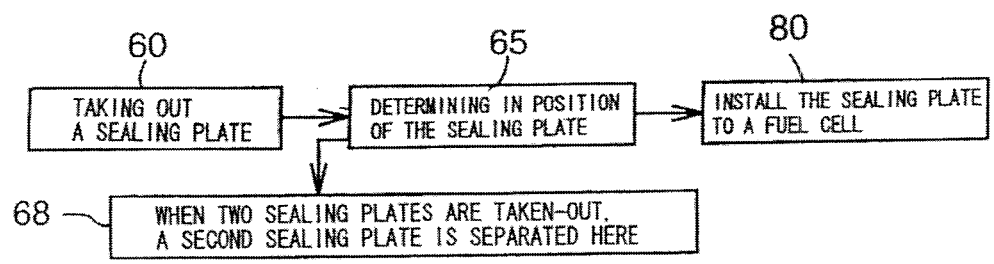
FIG. 17 is a block step diagram according to a fuel cell sealing plate taking-out method according to the third embodiment of the present invention.

In more detail, as illustrated in FIGS. 15-17, after taking out the sealing plate 36 and before installing the taken-out sealing plate to a fuel cell, at a sealing plate position determining station 65 (where using a position determining plate 66, a position of the sealing plate 36 is determined in the longitudinal direction and/or the width direction of the sealing plate 36), the sealing plate 36 taken out from the stack 61 of sealing plates and conveyed to the sealing plate position determining station 65 is sucked from the opposite sides thereof (e.g., from an upper side and a lower side of the sealing plate, or from horizontally opposite sides of the sealing plate), using a suction pad 62 and a suction plate 67. The suction by the suction pad 62 and/or the suction plate 67 is different between the case of taking out one sealing plate and the case of taking out two sealing plates. When taking out two sealing plates is detected using the suction difference, conveyance of the sealing plates 36 to the assembly step 80 of the fuel cell is stopped. Usually, the suction force of the suction plate 67 is increased, and when the suction of the suction pad 62 operates to ON, taking out of two sealing plates is deemed to happen, and the conveyance and supply of the sealing plates 36 to the next step (the assembly step 80 of the fuel cell) is stopped. In FIGS. 15 and 16, arrow S shows suction. Further, in FIG. 16, arrow R shows raise of the suction pad 62.

Figure 18:
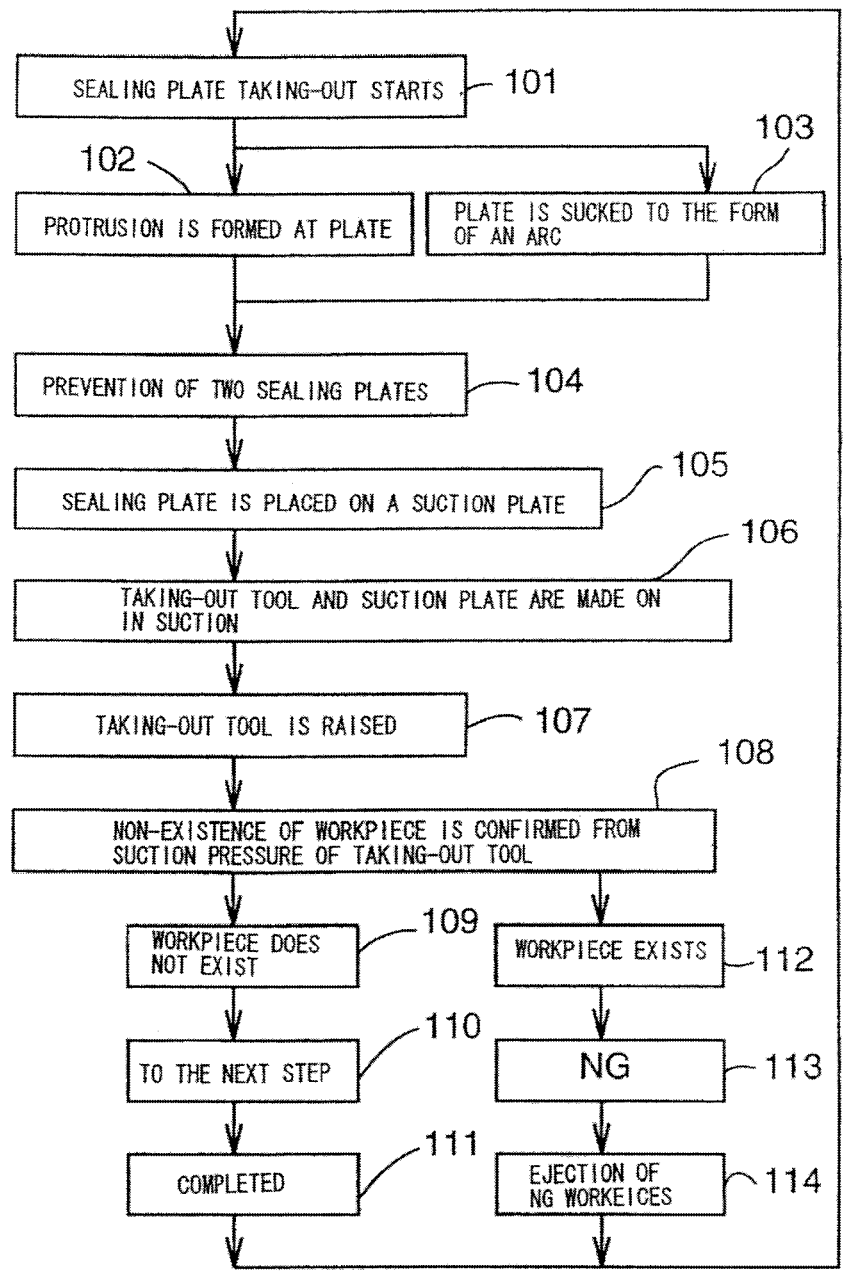
FIG. 18 is a flow chart of the fuel cell sealing plate taking-out method according to the third embodiment of the present invention.

FIG. 18 shows one example of a flow of steps of fuel cell sealing plate taking-out method including a step for preventing taking out of two sealing plates.

In FIG. 18, at step 101, a routine for taking out one sealing plate 36 from the stack 61 of sealing plates is begun. Taking out one sealing plate only is conducted by proceeding to step 102 where the protrusion 39 formed at the sealing plate 36 is used, or proceeding to step 103 where the sealing plate 36 is bent in the form of an arch. Any one of steps 102 and 103 may be adopted. Then, the routine proceeds to step 104 for preventing taking out of two sealing plates. At step 105, a sealing plate 36 is placed on the suction plate 67 if the position determining station 65. Proceeding to step 106, both suction of the suction pad 62 which is a taking-out tool and suction of the suction plate 67 are made ON. Proceeding to step 107, the suction pad 62 which is a taking-out tool is raised. Proceeding to step 108, a suction pressure of the suction pad 62 which is a taking-out tool is examined so that whether a sucked workpiece (a second workpiece in the case of taking out two sealing plates) exists or not is confirmed. When a workpiece sucked by the suction pad 62 exists, the suction pressure of the suction pad 62 is greater than the atmospheric pressure, while when a workpiece sucked by the suction pad 62 edoes not exist, the suction pressure of the suction pad 62 is zero (the atmospheric pressure).

When a workpiece sucked does not exist, proceeding from step 108 to step 109, after confirming at step 109 that a workpiece sucked does not exist, at step 110 the suction pad 62 conducts the next operation (where the suction plate 67 makes its suction OFF and the suction pad 62 conveys and supplies the sealing plate to the assembly step 80 of the fuel cell). At step 111 the routine is completed and returns to step 101 where the next taking-out of the next workpiece begins.

When a workpiece sucked exists, proceeding from step 108 to step 112, after confirming at step 112 that a workpiece sucked (a second sealing plate) exists, at step 113 generation of NG is confirmed. Then, at step 114, ejecting out the second sealing plate 36 (corresponding to step 68 of FIG. 17) is conducted, and then the routine returns to step 101 where the next taking-out of the next workpiece begins.

According to the fuel cell sealing plate taking-out method according to the third embodiment of the present invention, since the taken-out sealing plate 36 is sucked from opposite sides thereof, taking out two sealing plates can be detected by detecting the suction pressures using the routine of FIG. 18, because the suction pressures on the opposite sides differ from each other between in the case where two sealing plates are taken out and in the case where one sealing plate is taken out. When taking out of two sealing plates is detected, conveyance and supply of the sealing plates taken out to the next step can be stopped. As a result, incorrect installing of the sealing plate 36 can be prevented.

[Sealing Plate Taking-Out Apparatus According to a Third Embodiment]

A fuel cell sealing plate taking-out apparatus 60 according to a third embodiment of the present invention directly used in conducting the sealing plate taking-out method includes an apparatus for preventing taking out two fuel cell sealing plates disposed at a portion of a sealing plate conveyance route after taking out a sealing plate 36 from the stack 61 of sealing plates and before installing the taken-out sealing plate to a fuel cell. The two sealing plate taking-out preventing apparatus includes the suction plate 67 and the suction pad 62 which suck the sealing plate taken-out from the stack 61 of sealing plates from opposite sides thereof (for example, from an upper side and a lower side of the sealing plate).

According to the fuel cell sealing plate taking-out apparatus 60 according to the third embodiment of the present invention, since the apparatus includes the suction plate 67 and the suction pad 62, taking out two sealing plates can be detected by sucking the taken-out sealing plates from the opposite sides thereof (e.g., from the upper side and the lower side of the taken-out sealing plates), and conveyance and supply of the taken-out two sealing plates to the next step (fuel cell assembly step 80) can be stopped.

The examples described herein are merely illustrative, as numerous other embodiments may be implemented without departing from the spirit and scope of the exemplary embodiments of the present invention. Moreover, while certain features of the invention may be shown on only certain embodiments or configurations, these features may be exchanged, added, and removed from and between the various embodiments or configurations while remaining within the scope of the invention. Likewise, methods described and disclosed may also be performed in various sequences, with some or all of the disclosed steps being performed in a different order than described while still remaining within the spirit and scope of the present invention.

The invention claimed is:

1. A method of taking out a sealing plate of a fuel cell from a stack of sealing plates, the sealing plate being to be installed to a gas inlet/outlet passage of a fuel cell so as to cover a gas passage groove formed at the gas inlet/outlet passage, said method comprising:
   a first step of taking out the sealing plate one by one from the stack of sealing plates under a state that an air layer exists between adjacent sealing plates of the stack of sealing plates; and
   a second step, provided between the first step and a step of installing the taken-out sealing plate to the fuel cell, of (a) placing the taken-out sealing plate on a suction plate, sucking the sealing plate from opposite sides of the sealing plate by the suction plate and a suction pad thereby detecting taking out of two sealing plates based on a suction difference between a case of taking out a single sealing plate and a case of taking out two sealing plates, and (b) stopping conveyance of the sealing plate to the step of installing the taken-out sealing plate to the fuel cell when taking-out of two sealing plates is detected,
   wherein in order to obtain the state that an air layer exists between adjacent sealing plates of the stack of sealing plates at the first step, a protrusion is beforehand formed so as to protrude in a thickness direction of each sealing plate at an at least one surface of the sealing plate and at a portion of the sealing plate which corresponds to a portion of a sealing plate installing place of the fuel cell in a direction perpendicular to a gas flow direction at the sealing plate installing place.

2. A method according to claim 1, wherein the sealing plate is made from synthetic resin.

* * * * *